United States Patent [19]
Kusakabe et al.

[11] Patent Number: 5,553,526
[45] Date of Patent: Sep. 10, 1996

[54] CLAMP AND LOWER BLADE MECHANISM FOR A STEEL PIPE TRAVELLING CUTTING MACHINE

[75] Inventors: Yukio Kusakabe; Yorio Shikata, both of Kobe, Japan

[73] Assignee: Kusakabe Electric & Machinery Co., Ltd., Kobe, Japan

[21] Appl. No.: 210,227

[22] Filed: Mar. 17, 1994

[30] Foreign Application Priority Data

Dec. 7, 1993 [JP] Japan .................................. 5-306489
Dec. 7, 1993 [JP] Japan .................................. 5-306490

[51] Int. Cl.⁶ .......................... B23D 21/00; B23D 25/04
[52] U.S. Cl. ................... 83/319; 83/320; 83/382; 83/385; 83/456; 269/229
[58] Field of Search ............................. 83/318, 319, 320, 83/382, 383, 385, 386, 456; 269/229, 233, 234

[56] References Cited

U.S. PATENT DOCUMENTS

| | | | |
|---|---|---|---|
| 3,129,624 | 4/1964 | Auer | 83/320 X |
| 4,315,449 | 2/1982 | Borzym | 83/320 X |
| 4,563,927 | 1/1986 | Kinsley | 83/319 |
| 4,637,287 | 1/1987 | Kusakabe | 83/319 |
| 4,653,368 | 3/1987 | Riera et al. | 83/320 X |
| 4,848,723 | 7/1989 | Borzym | 83/320 X |
| 4,951,538 | 8/1990 | Borzym | 83/319 X |
| 5,161,444 | 11/1992 | Kusakabe et al. | 83/319 |

*Primary Examiner*—Eugenia Jones
*Attorney, Agent, or Firm*—Knobbe, Martens, Olson & Bear

[57] ABSTRACT

A clamp mechanism in a travelling cutting machine for a steel pipe, in which a clamp open-close wedge provided with a biasing spring is mechanically operated using a cam system in association with vertical movement of a lifting base plate, thereby minimizing a time lag between the operation times, and in which a lower front blade, an upper blade passing-gap adjusting member and a lower rear blade are made into an integral component, thereby easing exchange of the blades.

3 Claims, 12 Drawing Sheets

CLAMP AND LOWER BLADE MECHANISM FOR A STEEL PIPE TRAVELLING CUTTING MACHINE

BACKGROUND OF THE INVENTION

1. Field of the Invention

The present invention relates to a clamp mechanism and a lower blade supporting mechanism for a travelling cutting machine which, while travelling along a continuously produced steel pipe, clamps the steel pipe when the travelling speed of the machine coincides with that of the steel pipe, and while lowering an upper blade, cuts the steel pipe between the upper blade and a lower blade provided at the clamp mechanism.

2. Background of the Art

Conventionally, a clamp mechanism for a travelling cutting machine is disclosed and well-known in the U.S. Pat. No. 4,637,287 and U.S. Pat. No. 5,161,444.

Figure 12:
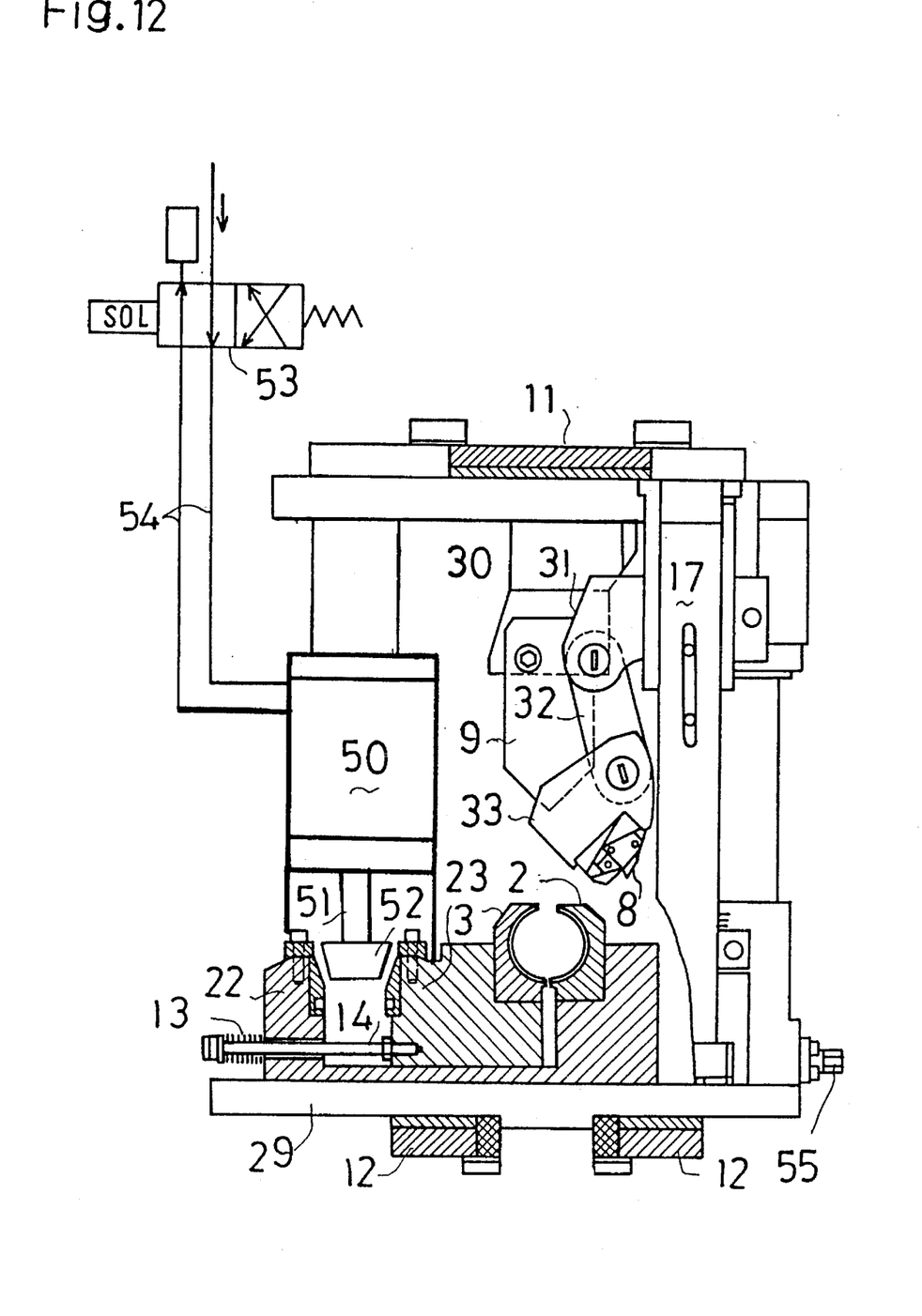
FIG. 12 is a front view of the die set in the conventional clamp mechanism.

The clamp mechanism on the above prior art is constructed as shown in FIG. 12, in which a pneumatic cylinder 50 vertically moves a wedge piston 51 so that a wedge 52 disposed at the lower end of the wedge piston 51 is alternately driven into or pulled out from between the lower-right-blade holder 22 and a lower-left blade-holder 23 and a clamp is laterally divided into two at the lower-right-blade holder 22 and lower-left blade-holder 23.

The lower-right-blade holder 22 is integral with a right lower blade 2, and the lower-left blade-holder 23 is integral with a left lower blade 3, the right lower blade 2 and left lower blade 3 constituting the clamp mechanism.

In detail, when the wedge piston 51 of the pneumatic cylinder 50 depresses the wedge 52, tapered cams 24 and 25 at the lower-right-blade holder 22 and lower-left blade-holder 23 are expanded therebetween so that the clamp mechanism formed by the left lower blade 3 and right lower blade 2 closes in a perpendicular direction to a steel pipe 1. Conversely, when the wedge piston 51 of the pneumatic cylinder 50 rises to pull out the wedge 52, an open-biasing spring 13 operates to move the lower-right-blade holder 22 and lower-left blade-holder 23 in an open position.

Conventionally, the wedge piston 51 of the pneumatic cylinder 50 moves vertically by switching a solenoid valve 53, the right lower blade 2 and left lower blade 3 being semicircular and operating also as the clamp mechanism.

The timing of the clamp opening and closing to cut the steel pipe is such that it does not disturb the following operations.

1. A die set mechanism move from a home position in the travelling direction of the pipe.

2. When the travelling speed of the die set mechanism coincides with the moving speed of the pipe, a signal is given to the solenoid coil so as to start the pipe clamping operation.

3. Upon completion of the pipe clamping operation, a cut command is given to lower a vertically movable base having an upper blade and a top cut blade.

4. Upon completion of the pipe cut operation, a command is given to the solenoid coil to release the pipe clamping.

5. Upon released the pipe, a command is given to the solenoid coil to reversely move the die set to return it to the home position.

In the above-mentioned pipe clamping mechanism, the timing of switching mechanisms in the valve once the electric signal has been given in the solenoid coil and that of exchanging the pipe and of flowing compressed air in the pneumatic cylinder to operate the piston thereof are problematic.

The total cycle time varies due to variation in the operation time of the mechanisms due to factors such as air temperature and lubrication conditions which create frictional resistance. Reduction of total cycle time for high speed cutting is problematic in that variation in operation time of the clamping mechanism, for example, can cause the upper blade to start cutting while the pipe is yet unclamped, resulting in damage to the upper blade. The travelling die set mechanism must be connected by an air pipe to a fixed air pressure supply, which complicates the mechanism.

Figure 10:
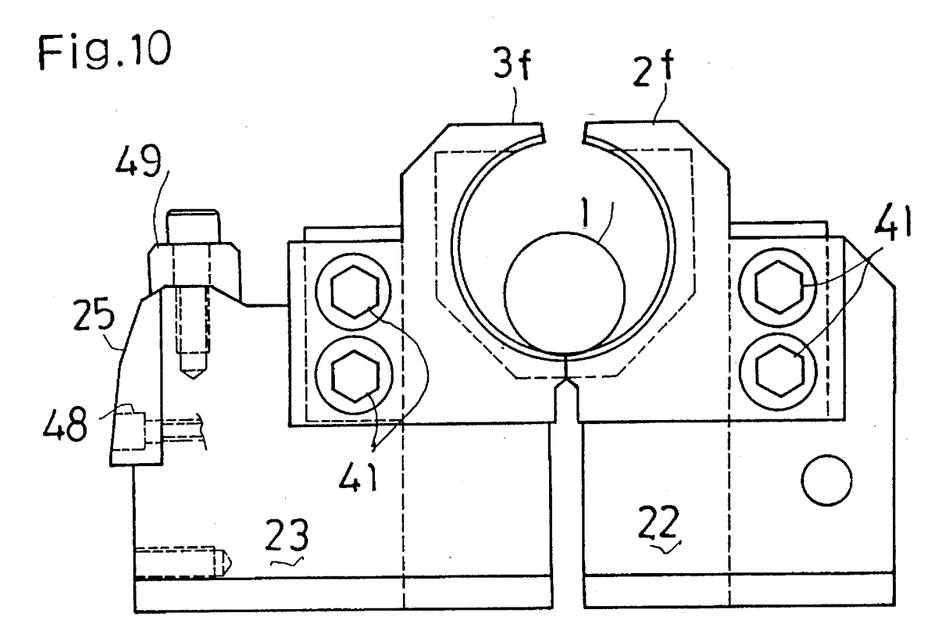
FIG. 10 is a front view of the conventional lower blade supporting mechanism.
Figure 11:
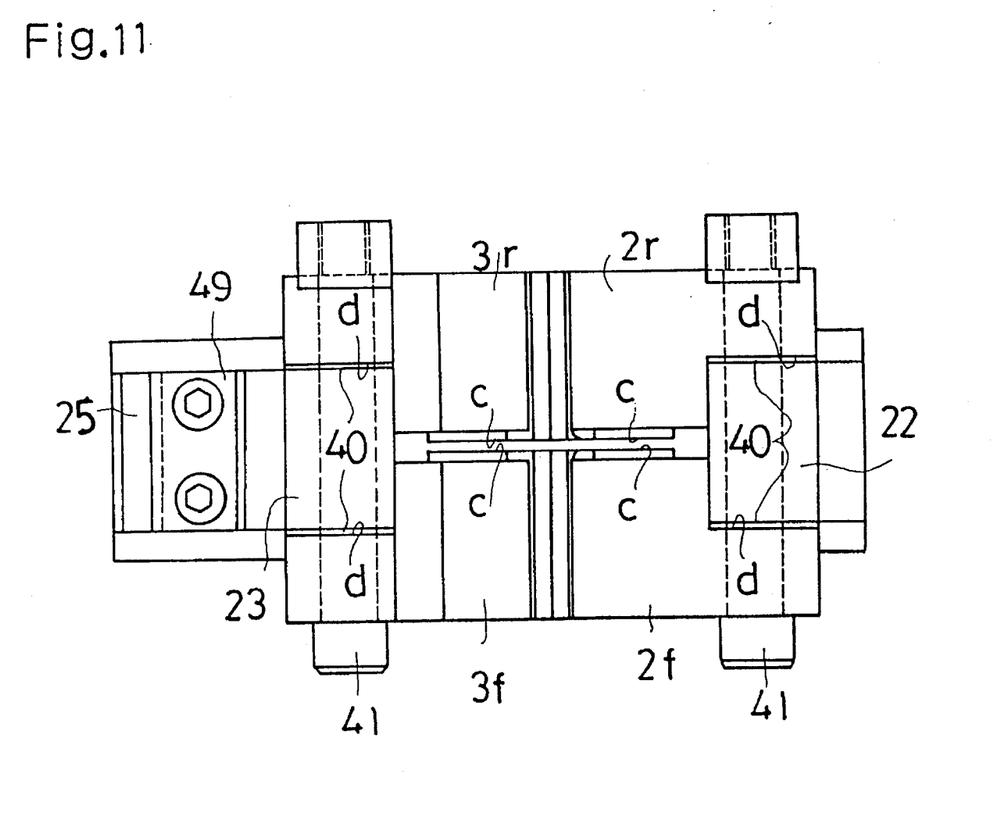
FIG. 11 is a plan view of the same.

In the prior art, a lower blade support mechanism is constructed as shown in FIGS. 10 and 11.

In detail, the lower blade mechanism is divided into four parts: a lower left front blade 3f, a lower left rear blade 3r, a lower right front right blade 2f and a lower right rear blade 2r. Among the four parts, the lower right front blade 2f and lower right rear blade 2r are connected to a lower-right blade-holder 22 with connecting bolts 41 and the lower left front blade 3f and lower left rear blade 3r are connected to the lower-left blade-holder 33 with said connecting bolts 41. Thus, two components comprising said four blades are disposed sandwiching therebetween an upper blade 9, all perpendicular to the steel pipe 1, said components being are bilaterally symmetrically disposed.

The lower blades are in four parts, disposed bilaterally in two double-bladed components because they are also used as the clamp mechanism for the steel pipe 1, thus must independently move to the right and left to expand or close a gap therebetween when clamping and releasing, and because the thickness of the sandwiched blade 9 must correspond to the thickness of a pipe to be cut, whereby the gap through which the upper blade 9 is passable can be changed.

The lower blades are connected to the lower blade holders in a conventional method as shown in FIGS. 10 and 11.

Adjusting shims 40 for adjusting the gap t through which the upper blade 9 passes are sandwiched between the lower blades which are longitudinally positioned corresponding to the thickness of the upper blade 9.

A disadvantage of the conventional lower blade supporting mechanism is that in order to change the thickness of the upper blade, the four connecting bolts must be removed from the lower blades on the die set, and the four adjusting shims 40 separately interposed between the blade and the blade holders must be replaced with other shims, necessitating a difficult physical posture for an operator, constituting bending himself forward onto the die set frame 29.

Moreover, changing size of the steel pipe 1 or the thickness of the upper blade 9 takes much time. Further, cutting surfaces c through which the upper blade 9 passes and fixed surfaces d in contact with the lower-right blade-holder 22 and lower-left blade-holder 23 must be fine-ground in parallel, and the lower right blade 2 and the lower left blade 3 must be machined, and requiring much time.

SUMMARY OF THE INVENTION

In order to enable the travelling cutting machine to cut a steel pipe at high speed, the operation time when the steel pipe is clamped must be minimized. In the conventional clamp mechanism, the time when the mechanism in a solenoid valve is switched after an electric signal is give therein and that when the solenoid valve is switched to flow compressed air into a pneumatic cylinder to operate a piston thereof, are problematic in that there is interposing frictional resistance in the mechanism and variation in the operation time of the mechanism, resulting in damage to the upper blade when the cutting operation starts before clamping of the pipe is completed. The present invention can eliminate the above-mentioned problems, enable the travelling cutting machine to perform high speed cutting of the steel pipe, and also improve the inconvenience and time loss inherent in the conventional lower blade mechanism.

An upper blade passing gap adjusting member 35 is separately formed corresponding to each thickness of the upper blade 9; the upper blade 9 is sandwiched between the lower left front blade 3f and the lower left rear blade 3r and between the lower right front blade 2f and the lower right rear-blade 2r; a pair of lower blade components divided into two in the forward moving direction of the pipe are connected by connecting bolts 38; and the lower left front blade 3f, upper blade passing gap adjusting member 35 and lower left rear blade 3r are integral, and the lower right front blade 2f, upper blade passing gap adjusting member 35 and lower right rear blade 2r are integral; whereby exchange of parts on a die set frame 29 is performed only by removing or mounting the four fixing bolts 36, so as to enable the upper blade passing gap adjusting member 35 to be exchanged at a position apart from the die set.

The above and further objects and novel features of the invention will become more fully apparent in the following detailed description in connection with the accompanying drawings.

DETAILED DESCRIPTION OF THE PREFERRED EMBODIMENT

Entire Construction of Die Set of Travelling Cutting Machine

Figure 1:
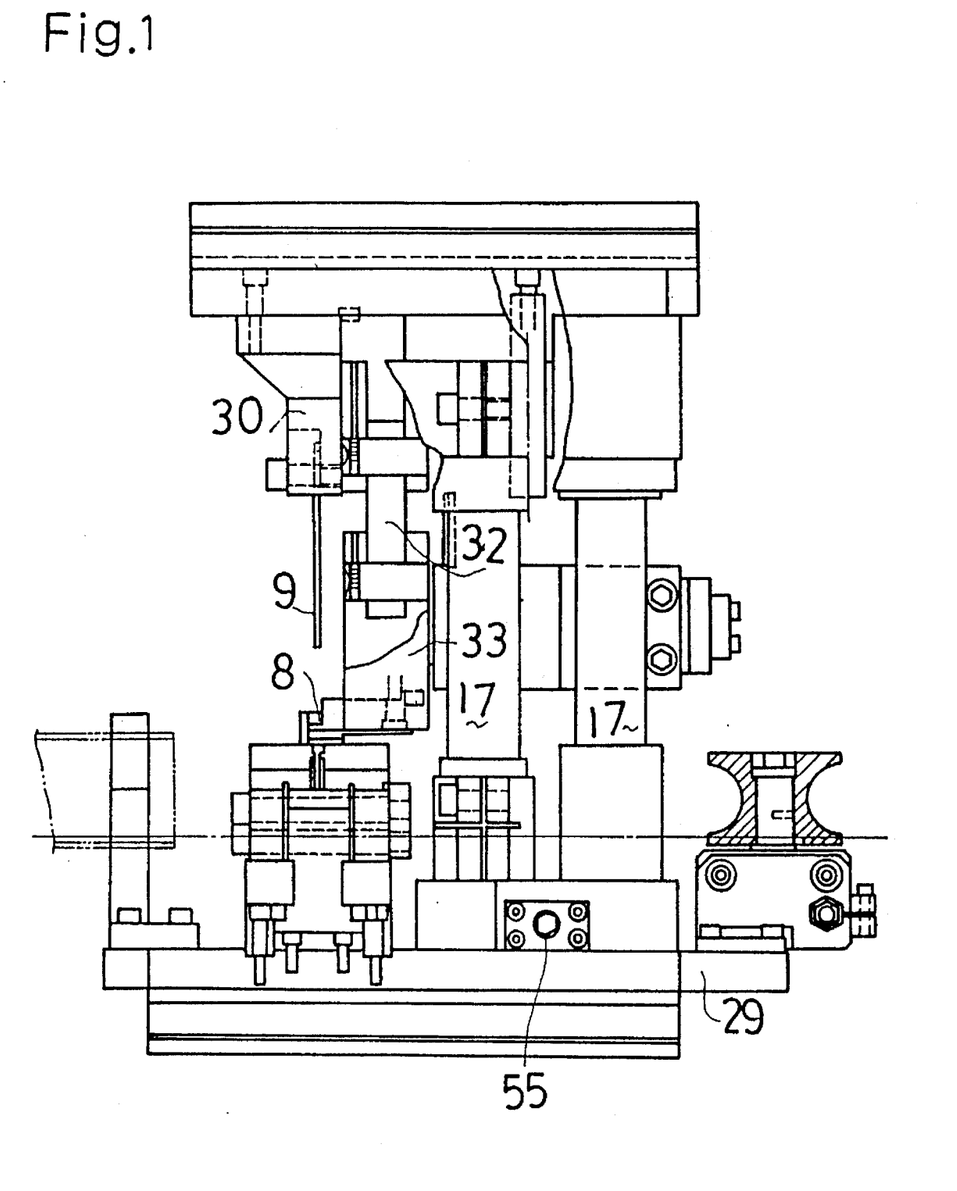
FIG. 1 is a side view of a die set for travelling-cutting a steel pipe by a travelling cutting machine of the present invention.
Figure 2:
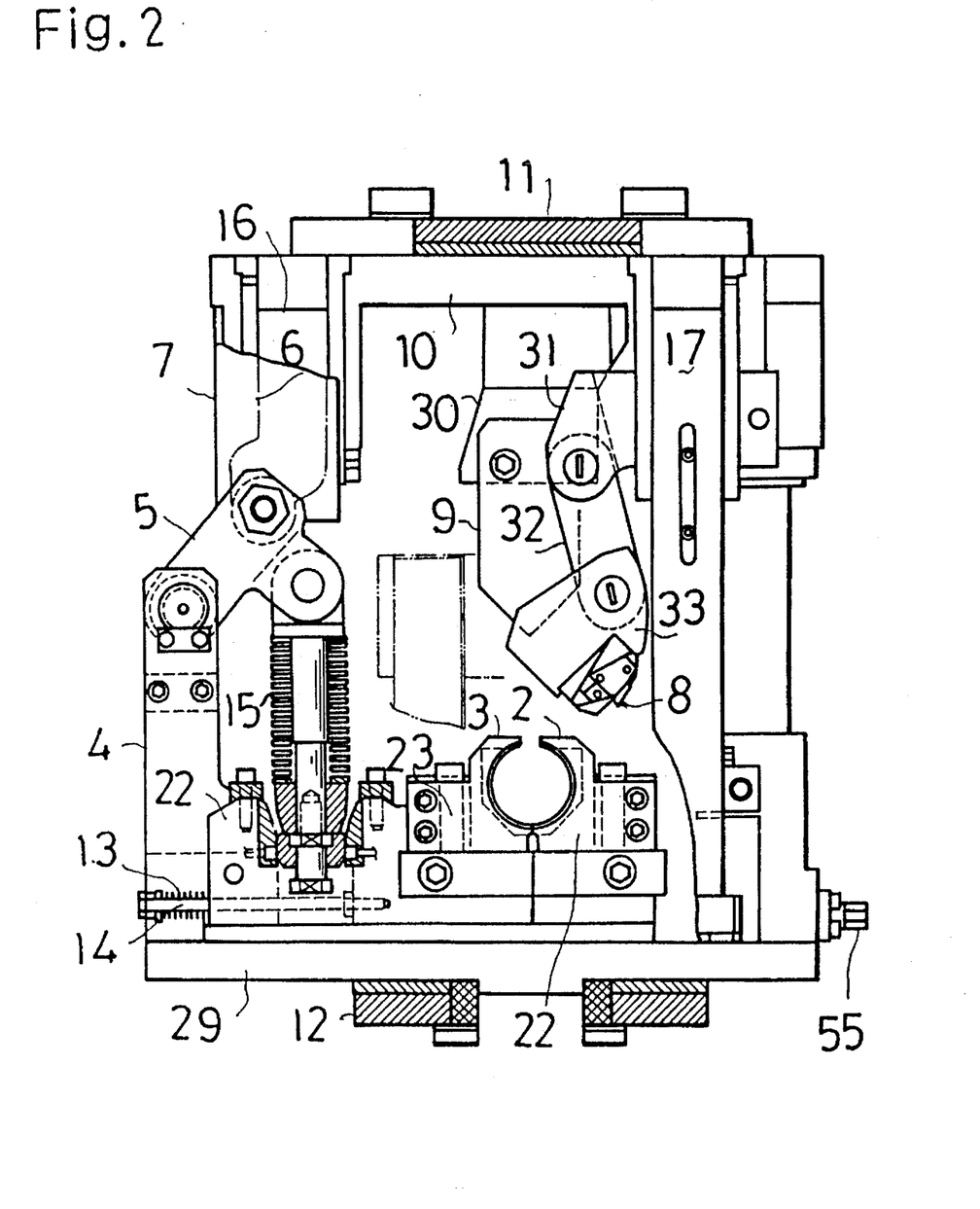
FIG. 2 is a front view of the die set of the same.
Figure 3:
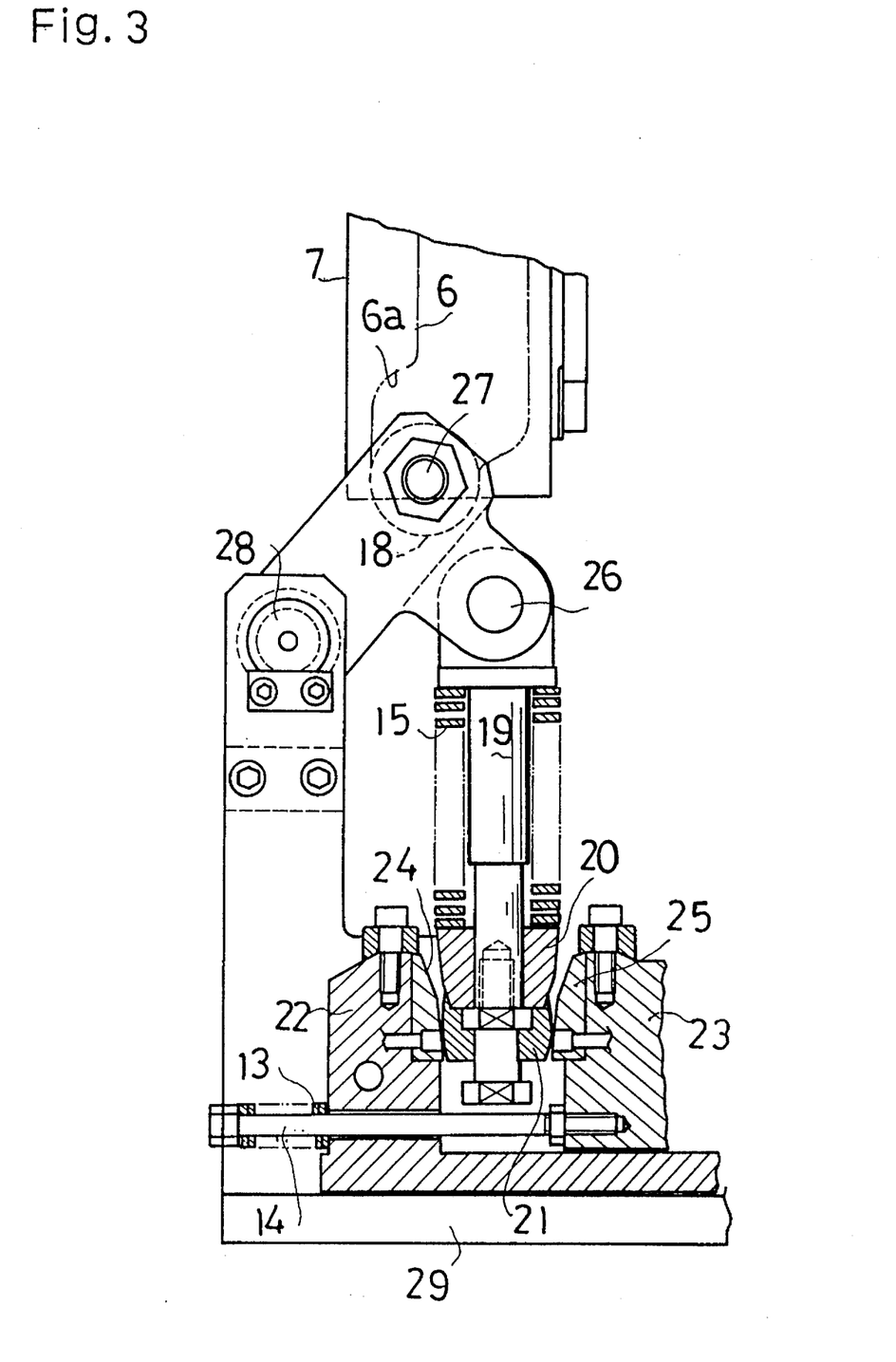
FIG. 3 is an enlarged sectional front view of a wedge piston 19 and a clamp open-close mechanism.

In FIGS. 1, 2 and 3, a die set mechanism is reciprocally slidable on lower blade rails 12, and a crank lifting rail 11 is disposed at the upper surface of the die set mechanism, the crank lifting rail 11 vertically moving by a separate crank mechanism. A lifting base 10 is vertically moved for cutting a steel pipe while sliding along the crank lifting rail 11. Four guide poles 16 and 17 are provided for vertically moving the lifting base 10, the lifting base 10 being constructed to vertically move along the guide poles 16 and 17.

An upper blade mounting member 30 downwardly projects from the lifting base 10 and an upper blade 9 is fixed to the lower end of the upper blade mounting member 30, the upper blade 9 vertically moving together with the lifting base 10 due to vertical movement of the crank lifting rail 11.

A top-cut blade 8 cuts slightly the lateral surface of the steel pipe to be cut. In order to laterally rotate the top-cut blade 8, a pivot member 31 projects from the lifting base 8, a connecting line 32 is pivoted to the pivoting member 31, the connecting link 32 is pivoted at the lower end thereof to one end of a bell crank arm 33, and the bell crank arm 33 is pivoted to a pivot shaft vertically adjustable.

The top-cut blade 8 is fixed to the other end of the bell crank arm 33, which is adjusted in position to enable the thickness and position of the top-cut to be adjusted, the position of the bell crank arm 33 being adjusted by a top cut blade adjusting screw bolt 55.

In the aforesaid construction of the present invention, a clamp mechanism comprises a lower-right blade-holder 22 and a lower-left blade-holder 23, in which a die set frame 29 slides along a slide rail 12, an arm support 4 projects upwardly from the die set frame 29, a pivot shaft 28 is provided at the upper end of the arm support 4, a cam follower 5 is pivotally supported at one end thereof to the pivot shaft 28, a cam follower 18 is pivotally supported to an intermediate portion of the cam follower 5 by a pivot shaft 27, and a wedge piston 19 is pivotally supported at the upper end thereof to a pivot shaft 26 at the other end of the cam follower 5.

The cam follower 18 is fitted into a cam groove 6 bored at a cam guide 7 and an engageable curve 6a is formed at the cam groove 6, so that when the cam follower 18 contacts the engageable curve 6a, the cam follower 5 is downwardly biased to bring a spherical seat wedge 21 into press contact with tapered cams 24 and 25 to enlarge a gap between the lower-right blade-holder 22 and the lower-left blade-holder 23, and the clamp comprising the right lower blade 2 and left lower blade 3 holds therebetween the steel pipe 1. Excess clamping force generated due to the diameter of steel pipe 1 is absorbed by a biasing spring 15.

When the lifting base 10 upwardly returns, the cam follower 5, wedge piston 19 and spherical seat wedge 21 upwardly return, the lower-right blade-holder 22 and lower-left blade-holder 23 are biased by an open-biasing spring 13 again in the direction of close contact with each other through a return rod 14, whereby the lower right blade 2 and lower left blade 3 leave an open space therebetween.

The spherical seat wedge 21 is disposed at the lower end of the wedge piston 19, a spring seat 20 is provided on the spherical seat wedge 21, the biasing spring 15 is freely fitted onto the outer periphery of the wedge piston 19, and the tapered cams 24 and 25 abutting against the spherical seat wedge 21 are fixed to the lower-right blade-holder 22 and lower-left blade-holder 23 respectively.

Lower Blade Supporting Mechanism

In FIG. 3 through 9, the lower-left blade-holder 23 and lower-right blade-holder 22 are biased by the spherical wedge 21 lowering together with the lowering lifting base 10 toward the tapered cams 24 and 25 provided at the left side, thereby slidably moving in the direction the steel pipe 1 so as to clamp the same. Thus, the upper blade is machined and the steel pipe 1 is cut between the upper and lower blades. After cutting, the lifting base 10 lifts and the spherical seat wedge 21 rises, so that the lower-right blade-holder 22 and lower-left blade-holder 23 are released by the open-biasing spring 13.

Figure 4:
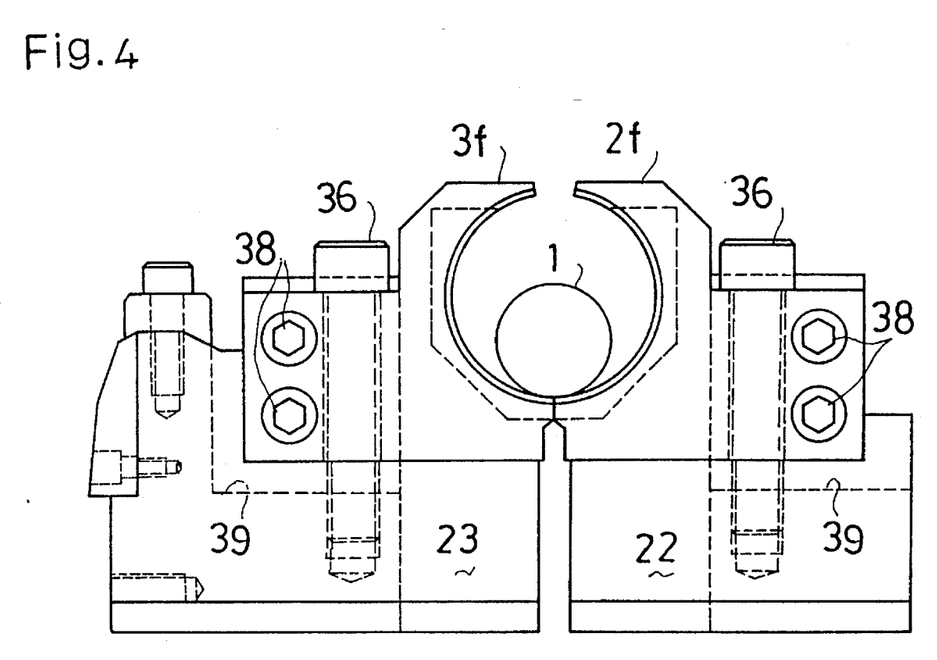
FIG. 4 is a front view of a lower blade supporting mechanism of the invention.
Figure 5:
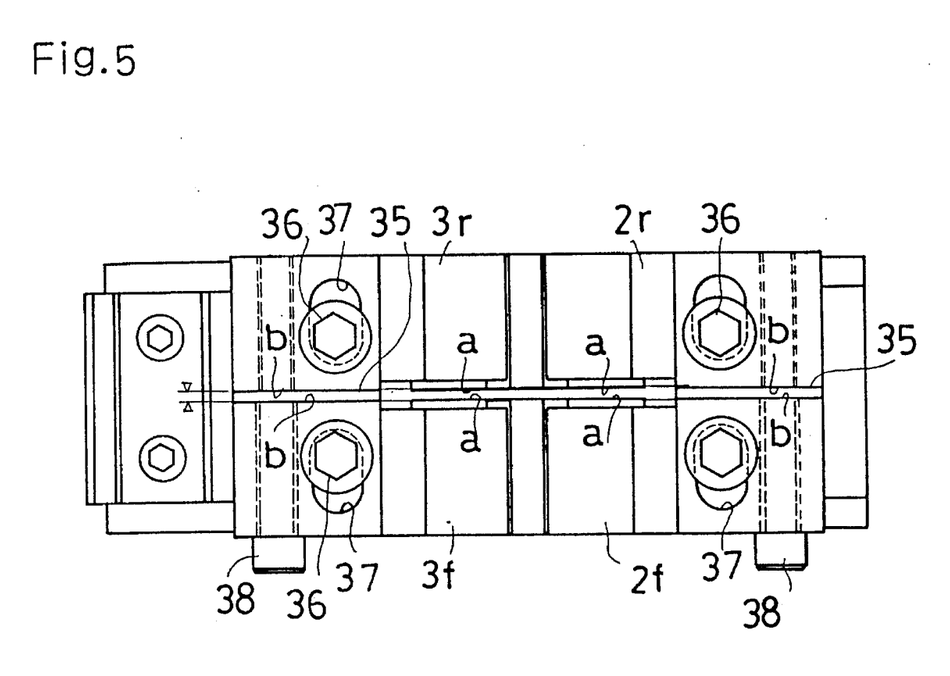
FIG. 5 is a plan view of the same.
Figure 6:
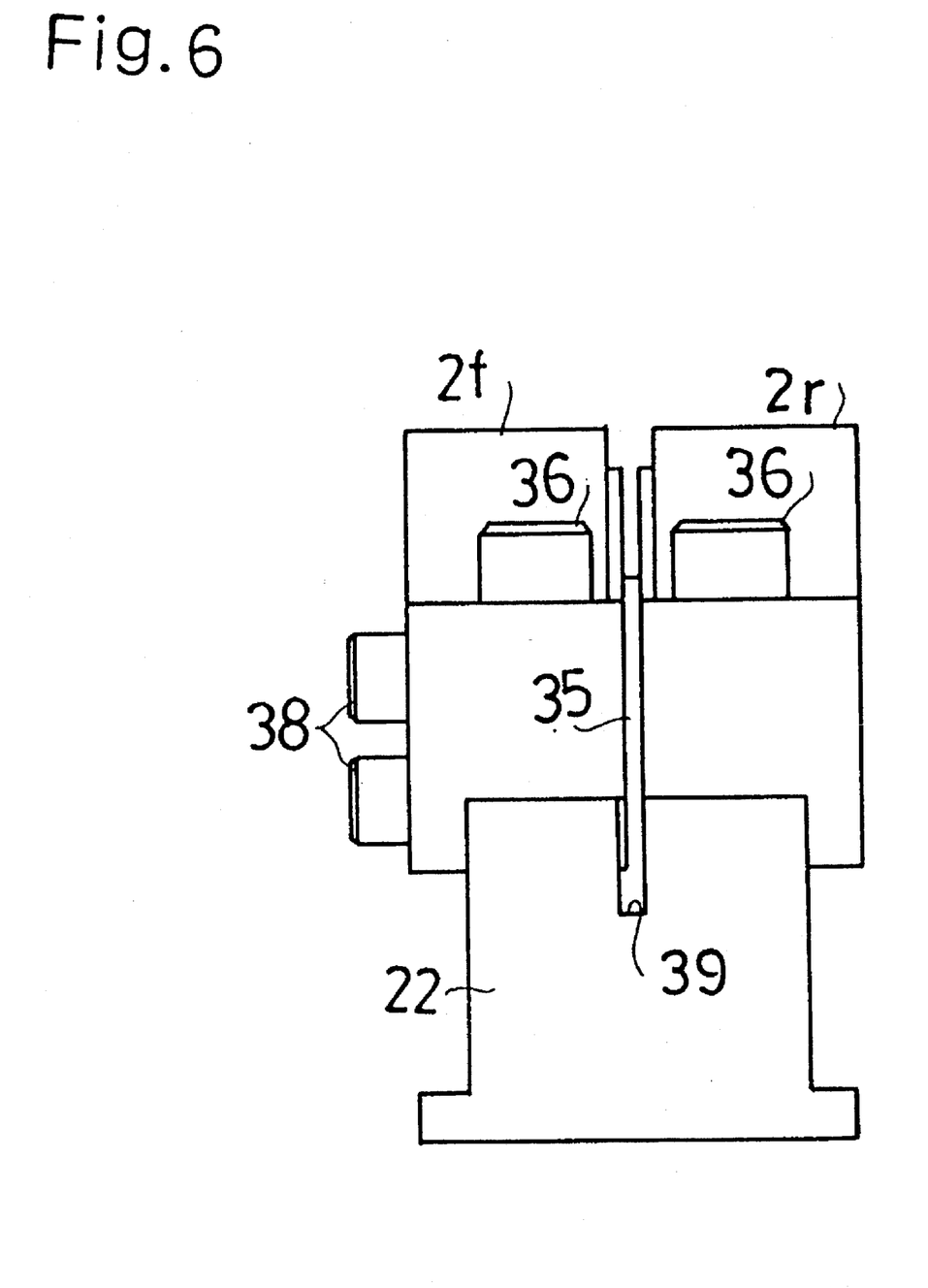
FIG. 6 is a side view of the same.
Figure 7:
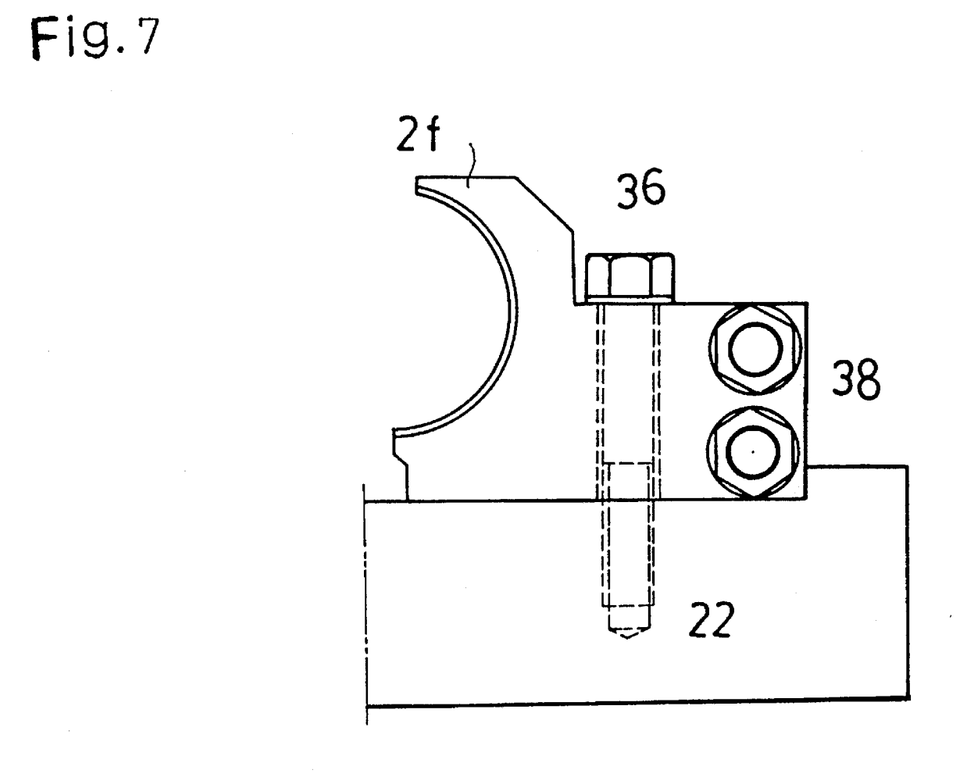
FIG. 7 is a front view of a right lower blade 2.
Figure 8:
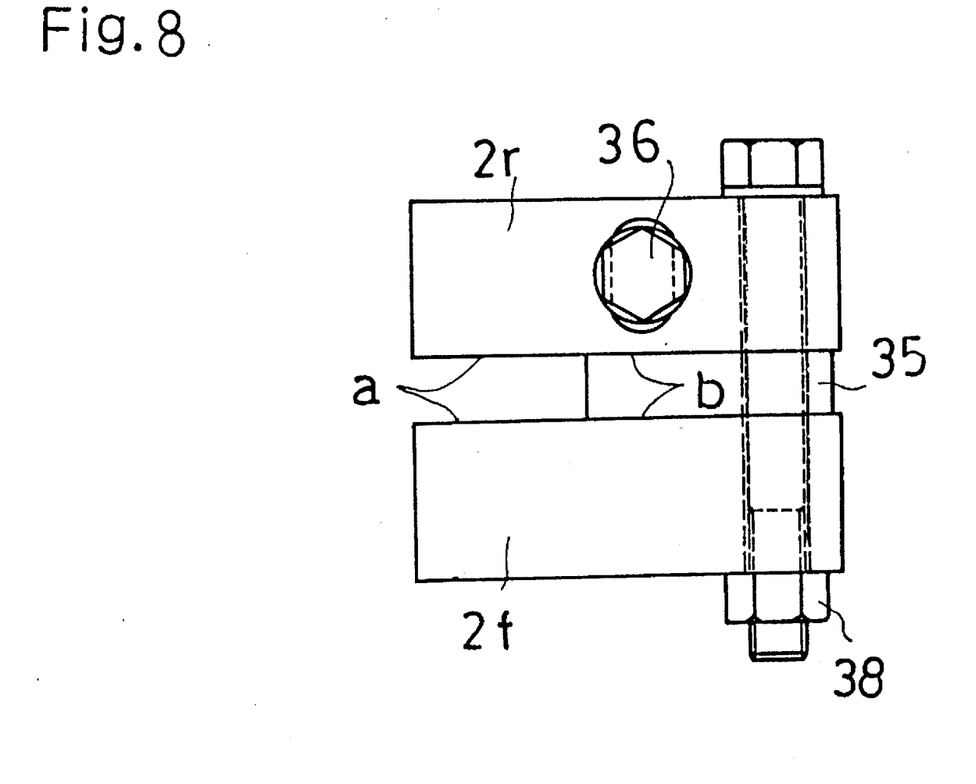
FIG. 8 is a plan view of the same.

The lower left front blade 3f, upper passing-gap adjusting member 35, and lower left rear blade 3f are integral with each other using the horizontal connecting bolts 38 and fixed to the lower-left blade-holder 23 using two vertical connecting bolts 36.

The lower right front blade 2f and lower right rear blade 2r and upper blade passing-gap adjusting member 35 sandwiched therebetween are integral with each other using two horizontal connecting bolts 38 and fixed to the lower-right blade-holder 22 using two fixing bolts 36.

Conventionally, an adjusting shim 40 is interposed between the lower left front blade 3f and the lower-left blade-holder 23, and between the lower left rear blade 3r and the holder 23 is interposed a shim 40 to form a gap into which the upper blade 9 is fitted.

The present invention, however, directly interposes a sheet of the upper blade passing-gap adjusting member 35 between the lower left front blade 3f and the lower left rear blade 3r.

Similarly, a sheet of upper blade passing-gap adjusting member 35 equal in thickness to the above is directly interposed between the lower right front blade 2f and the lower right rear blade 2r. Thus, the conventional four adjusting shims 40 interposed at four portions are substituted by the two upper blade passing-gap adjusting members 35 between the lower right front blade 2f and the lower right front blade 2r and between the lower left front blade 3f and lower left rear blade 3r.

Conventionally, the surfaces of the interposing adjusting shims 40 which abut against the lower-right-blade holder 22 and face the upper blade 9 must be fine-processed, but in the present invention, since the surfaces "b" interposing the upper blade passing gap adjusting member 35 and the surface "a" facing the upper blade 9 are level to each other, only one surface need be fine-processed.

Figure 9:
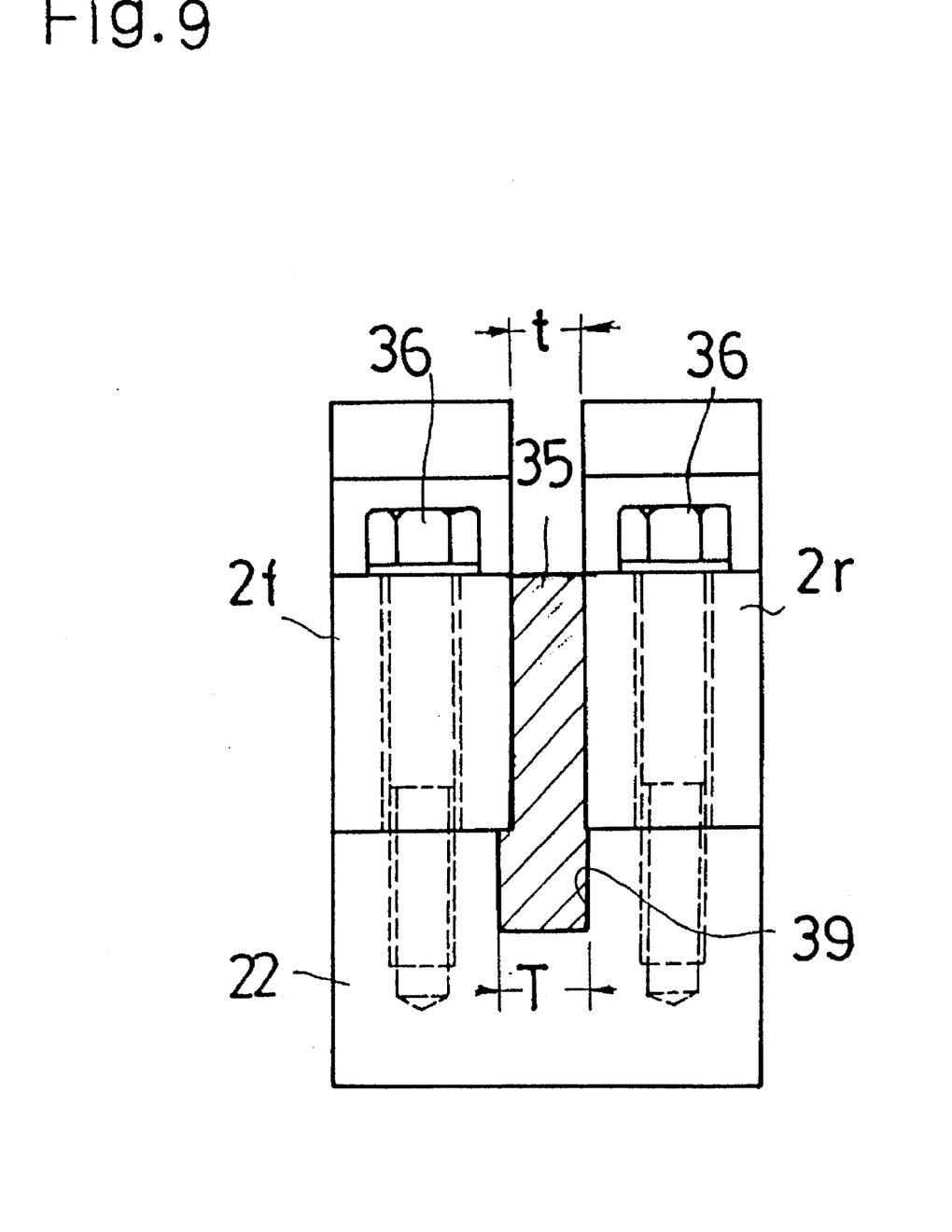
FIG. 9 is a side view of an upper blade passing-gap adjusting member 35.

The upper blade passing gap adjusting member 35, as enlarged in FIG. 9, is formed of a plate two stepped in thickness. An upper portion of the member 35 corresponding to thickness t is made slightly larger in thickness than the upper blade corresponding thereto. A lower portion of the member 35 corresponding to thickness "T" is to be fitted into a fitting groove 39 bored at the lower-right-blade holder 22 and lower-left-blade holder 23 for positioning the member 35. All the prepared upper blade passing gap adjusting members 35 are the same.

The portion of the upper blade passing gap adjusting member 35 in thickness T is inserted into the fitting groove 39 between the lower-right-blade holder 22 and the lower-left-blade holder 23, so that the lower right front blade 2f and lower right rear blade 2r are positioned with respect to the lower-right-blade holder 22, and the lower left front blade 3f and lower left rear blade 3r are positioned with respect to the lower-left blade-holder 23. Thus, the lower right front blade 2f, upper blade passing-gap adjusting member 35 and lower right rear blade 2r are integral with each other using the horizontal connecting bolts 38, and the left lower blade 3f, upper blade passing-gap adjusting member 35, and fixing bolts 36 are integral with each other using the connecting bolts 38.

This integration or disassembly work is adapted to be performed in a position apart from the die set.

The upper blade passing-gap adjusting members 35 are prepared in sets having each thickness corresponding to the upper blade 9, and the right lower blade 2 and left lower blade 3 are prepared as spares. Hence, during the cutting work at the die set, the right lower blade 2 and left lower blade 3, each having the next upper blade passing-gap adjusting member 35 interposed therein, are prepared so that the right lower blade 2 and left lower blade 3 in use, by releasing the vertical fixing bolts 36, can be immediately removed from the die set frame 29 and replaced with the next right lower blade 2 and left lower blade 3, each having set therebetween the next upper blade passing-gap adjusting member 35 interposed therein.

As shown in FIG. 5, bolt bores 37 for inserting therein the vertical fixing bolts 36 and for fixing the right lower blade 2 and left lower blade 3 to the lower-right blade-holder 22 and lower-left blade-holder 23, are formed in an elongated shape so that the positions of the lower-right blade 2 and the lower-left blade 3 can be adjusted depending on the thickness of the upper blade 9, by using the fixing bolts 36. In addition, in the upper blade passing-gap adjusting member 35, bolt bores, through which the vertical connecting bolts 38 pass, are formed as is formed in the right lower blade 2 and left lower blade 3.

Operation of Clamp Mechanism

Instead of the open-close drive by a pneumatic cylinder, like the movement of the top-cut blade drive, the vertical movement of the lifting base for the upper blade is converted to motion to perform drive and pull-out of the wedge, using a combination of the cam mechanism, the lever mechanism and the spring mechanism. Operation in the total cycle is performed in the following steps:

1. The die set mechanism is moved from the home position in the direction of the forward-moving pipe.

2. When the travelling speed of the die set mechanism coincides with the moving speed of the pipe, a cutting command is given and the lifting base is lowered.

3. A series of operations are performed in sequence between lowering and raising the lifting base: pipe clamping, top-blade cutting, upper blade cutting, upper blade return, top blade return and pipe clamp release. Variation in the operation is eliminated.

4. Upon return of the base, the die set mechanism is reversely moved to return to the home position.

The above-mentioned mechanism eliminates the problem of variation in the operation time of releasing the pipe clamping in the prior art. Moreover, the mechanical inconvenience of a pneumatic pipe connected to the travelling die set mechanism can be eliminated.

When the lifting base 10 lowers, the cam follower arm 5 does not change in position when the cam follower 18 is at the straight portion of cam groove 6 of the cam guide 7, but, when the cam follower 18 reaches the curved portion 6a of the cam groove 6, the cam follower 18 is depressed to rotate the cam follower arm 5 around the fixed shaft for supporting the cam follower arm 5, in the direction of depression of the wedge piston 19.

The spherical seat wedge 21, which is fitted into the utmost end of the wedge piston 19 provided with the biasing spring 15, is inserted by compression force caused by the biasing spring between the tapered portions of the lower-left and lower-right blade-holders, thereby closing the clamp.

The cam groove 6 is formed so that the cutting operation of the blade starts at the point when the clamping is completed. When the lifting base 10 rises after cutting, the cam follower 5 again rotates upwardly by operation of the cam groove 6 and cam follower 18 to thereby remove the spherical wedge 21 from between the lower-left and lower-right blade-holders, the biasing spring 13 is inserted between the lower-right and lower-left holders operating to completely open a space between the lower-right and lower-left blade holders, thereby completing the clamping release.

Effect of Clamp Mechanism

The clamp mechanism of the present invention is constructed as the above and has the following effects: in the conventional clamp open-close mechanism, a time lag exists until an electric signal command is given to the solenoid coil 53, which is switched to supply compressed air to the pneumatic cylinders 50 through an air pipe 54, the wedge piston 51 lowers to expand the gap between the lower-right blade-holder 22 and the lower-left blade-holder 23, and both the right lower blade 2 and left lower blade 3 sandwich the pipe therebetween. In the present invention, however, the operation of lifting base 10 is transmitted to the wedge piston through the cam followers 18 and the cam follower arm 5, whereby the time lag can be reduced to enable the travelling cutting machine to be used for high speed cutting.

In the conventional pipe clamp mechanism, the period of time from the point when the electric signal is given to the solenoid valve to the point when the mechanism therein is switched, and the period of time from the point when the pipe is renewed to the point when the compressed air flows to the pneumatic cylinder so as to actuate the piston thereof are problematic. In the total cycle, the above period of time is relatively long. In addition, the operation time varies depending on temperature and lubrication conditions, due to frictional resistance inherent in the mechanism affected thereby. Hence, when the total cycle time is reduced for high speed cutting, the upper blade may start the cutting operation before pipe-clamping is completed, causing damage to the upper blade. However, the present invention directly and mechanically constitutes the clamp open-close mechanism thereby eliminating the above problem.

Moreover, in the conventional mechanism, there is a defect in that an air pipe from a fixed air pressure supply must be connected to the travelling die set mechanism, thereby complicating the mechanism. The present invention can eliminate this defect.

Operation of Lower Blade Mechanism

The cut surfaces "a" of the lower blade between which the upper blade passes and the surfaces "b" in contact with the surface of the upper blade passing-gap adjusting member 35 are formed in the same plane, whereby the surfaces "a" and "b" can be processed by a surface grinding work at the same time. The upper blade passing-gap adjusting member 35 is two-stepped in thickness as shown, and thickness t of the upper portion is prepared corresponding to the upper blade on use. Meanwhile, thickness T of the lower portion is constant and larger than the maximum thickness of the upper blade. At the lower blade holder, a groove is formed into which the upper blade passing-gap adjusting member 35 can just be fitted. Threaded bores are formed so that the lower left front blade 3f and lower left rear blade 3r and the lower right front blade 2f and lower right rear blade 2r can be fixed respectively with screw bolts. Bores, into which the connecting bolts 38 for connecting the pair of lower front and lower rear blades and the upper blade passing-gap adjusting member 35 sandwiched therebetween are inserted, are formed separately from those into which the fixing bolts for fixing the pair of lower-right blade-holder 2 and lower-left blade-holer 3 to the right lower blade holder 22 and left lower blade holder 23 are inserted respectively.

Effect of Lower Blade Supporting Mechanism

Sets of lower blade components corresponding to various sizes of upper blades and adjusted for gap size, can be prepared. Hence, when an upper blade of different thickness is used in order to cut a pipe having a different thickness, the lower blades can be exchanged for those corresponding to the new upper blade simply by removing four bolts and positioning the corresponding lower blades. Such exchange work significantly reduced the number of steps in comparison with the conventional work of exchanging the adjusting shims, whereby productivity can be increased even at a manufacturing factory frequently changing the pipe size.

While an embodiment of the invention has been shown and described, the invention is not limited to this specific construction, which is merely exemplary in the specification rather than defined thereby.

What is claimed is:

1. A clamp mechanism for a travelling cutting machine which clamps and cuts a continuously manufactured and longitudinally transported steel pipe at a given length when moving from a home position at the same speed and in the same direction as said steel pipe, and which returns to said home position after cutting said steel pipe, said clamp mechanism comprising:

a base frame;

a lifting base plate which moves in a vertical direction;

a lower blade mechanism for clamping said steel pipe, provided on said base frame, said lower blade mechanism composed of two blade portions, in which said blade portions are capable of accommodating said steel pipe therebetween and clamping said steel pipe with a sliding motion of one blade portion towards the other blade portion;

a wedge mechanism for horizontally pushing said one blade portion towards the other blade portion by a downward movement of said wedge mechanism, said wedge mechanism comprising:

an upper wedge unit having a wedge piston which moves in a vertical direction a lower wedge unit having a seat wedge, said seat wedge horizontally moving said one blade portion towards the other blade portion to clamp said steel pipe placed therebetween, when being pushed downward; and a biasing spring placed between part of said upper wedge unit and said lower wedge unit, said biasing spring pushing said lower wedge unit downward when downward movement of said upper wedge unit causes said biasing spring to be pushed downward;

a cam follower arm having a cam follower, said cam follower arm being pivoted at a fixed point with respect to said base frame, said cam follower arm being pivotally attached to said wedge mechanism so that the movement of said cam follower is transmitted to said wedge mechanism; and a cam guide having a cam groove into which said cam follower is fitted, said cam guide being fixed to the underside of said lifting base plate, in such a way that when said cam guide moves downward in association with movement of said lifting base plate, said wedge mechanism moves downward via said cam follower arm so as to accomplish clamping of said steel pipe with said blade portions.

2. The clamp mechanism for a travelling cutting machine according to claim 1, wherein said cam groove in said cam guide comprises a vertical portion and a curved portion along which said cam follower moves, in which said wedge mechanism moves in a vertical direction when said cam follower is positioned at said curved portion of said cam groove.

3. The clamp mechanism for a travelling cutting machine according to claim 1, wherein each blade portion comprises a detachable blade unit constituted by front and rear blades between which a gap-adjusting member is interposed; and a blade-holder which holds said front and rear blades.

* * * * *